United States Patent Office 3,109,844
Patented Nov. 5, 1963

3,109,844
3-(3-INDOLYL)PYRROLIDINES
Yvon G. Perron, Dewitt, and William F. Minor, Fayetteville, N.Y., assignors, by mesne assignments, to Bristol-Myers Company, New York, N.Y., a corporation of Delaware
No Drawing. Filed Sept. 16, 1959, Ser. No. 840,260
13 Claims. (Cl. 260—247.2)

This invention relates to several previously unreported types of indole derivatives and processes for their preparation. Coincident with the synthesis of the new indole derivatives, several new preparatory methods for previously reported indole derivatives have been found. Thus, three new convenient methods for the preparation of β-(3'-indolyl)-propionic acid, as well as two new methods of preparing 3-indolylsuccinic acid, have been found.

The new compounds of the present invention are of two types. The first type includes 3-indolylsuccinimide, N-substituted derivatives of 3-indolylsuccinimide of the formula

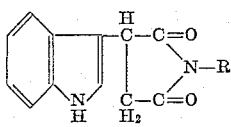

wherein R represents a member of the group consisting of alkyl, dialkylaminoalkyl, (N-morpholino)alkyl, and (2-pyridyl)alkyl; and acid addition salts of the basic compounds. The second type includes 3-(3'-indolyl)pyrrolidine and N-substituted derivatives of 3-(3'-indolyl)pyrrolidine of the formula

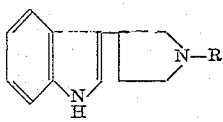

wherein R represents a member of the group consisting of alkyl, dialkylaminoalkyl, (N-morpholino)alkyl; and (2-pyridyl)alkyl and acid addition salts of these basic compounds. The term alkyl as used here and in the appended claims is intended to be a lower alkyl grouping, containing from one to five carbon atoms.

Both of these new series of compounds are conveniently prepared from 3-indolylsuccinic acid. Thus, the simpler 3-indolylsuccinimides are prepared by heating 3-indolylsuccinic acid with either urea or a 1,3-dialkylurea, or any of the 3-indolylsuccinimides may be prepared by heating this acid with ammonia or a substituted ammonia derivative. The 3-(3'-indolyl)pyrrolidines are prepared in turn from the 3-indolylsuccinimides by reducing the carbonyl groups with a suitable reducing agent.

3-indolylsuccinic acid may be prepared by a variety of methods. Two new methods for the preparation of 3-indolylsuccinic acid have been found and these have proved to be excellent methods for its synthesis. Due to the ease of decarboxylation of 3-indolesuccinic acid, both of these methods may be used, as preparative methods for β-(3-indolyl)propionic acid.

These new compounds are of great utility. Thus, the 3-(3'-indolyl)pyrrolidines show antiserotonin, antiallergenic and central nervous system activities. The 3-indolylsuccinimides are useful as pharmaceutical intermediates.

The starting compound for the total synthesis of the new indole derivatives of this invention is 3-indolealdehyde (indole-3-carboxaldehyde) which has been prepared by a variety of methods. One of the most convenient methods is that reported by G. F. Smith (J. Chem. Soc. 1954, 3842), which gives a 95% yield of the aldehyde by reacting indole with the reaction product of dimethylformamide and phosphorus oxychloride. Treatment of 3-indolealdehyde by either of the methods described below yields 3-indolylsuccinic acid. Heretofore, there were only two reported methods of preparing 3-indolylsuccinic acid and both of these methods are rather long and laborius. The first synthesis of 3-indolylsuccinic acid was reported by Diels, Alder and Lübbert [Ann. 490, 277 (1931)] although they were not sure of the identity of the final product and its structure was not elucidated until over twenty-five years later by Noland and Hammer [J. Org. Chem. 23, 320 (1958)]. Essentially, the synthesis of Diels et al. involved heating indole and malic anhydride to form maleydiindole, followed by an alkaline hydrolysis step to yield the acid. The other synthesis of 3-indolylsuccinic acid was reported by Jackson and Manske [Can. J. Research 13B, 170 (1935)]. Their method involved diazotizing diethyl aspartate (diethyl aminosuccinate) hydrochloride reacting the diethyl diazosuccinate with indole and then hydrolyzing the ester to the acid. Both the teams of Jackson and Manske, and Noland and Hammer have reported that 3-indolesuccinic acid readily decarboxylates to β-(3-indolyl)propionic acid.

The two new methods of preparing 3-indolylsuccinic acid utilize as the starting compound 3-indolealdehyde. These methods are shown by the following reaction scheme, wherein R represents a lower alkyl group and X represents either a cyano or carboalkoxy group.

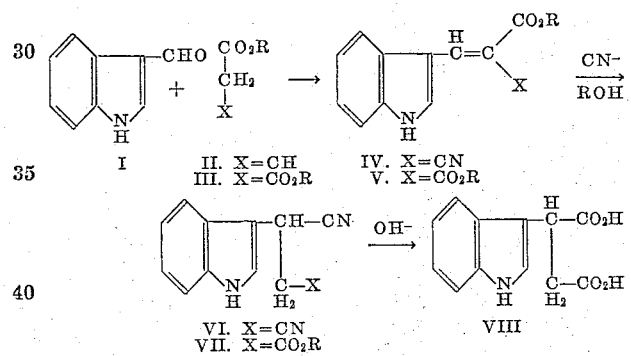

Thus, according to the first scheme, in which X represents a cyano group, 3-indolealdehyde (I) is condensed with an alkyl cyanoacetate (II), preferably in the presence of an organic nitrogenous base catalyst. The resulting alkyl 2-cyano-3-(3'-indolyl)acrylate is treated with alcoholic cyanide so as to add hydrogen cyanide to the olefinic linkage, which saturates the aliphatic double bond and replaces the carboalkoxy group with a second cyano group to form 3-indolylsuccinonitrile (VI). The nitrile (VI) is then hydrolyzed to 3-indolylsuccinic acid (VIII). The second scheme, in which X represents a carboalkoxy group, involves condensing 3-indolealdehyde (I) with a dialkyl malonate (III), preferably in the presence of an organic salt catalyst. The resulting alkyl 2-carboalkoxy-3-(3'-indolyl)acrylate (V) is treated with alcoholic cyanide so as to add hydrogen cyanide to the olefinic linkage which saturates the aliphatic double bond and replaces one of the carboalkoxy groups with a cyano group to yield an alkyl 3-cyano-3-(3'-indolyl)propionate (VII). The cyanopropionate is then hydrolyzed to yield 3-indolylsuccinic acid (VIII). Pyrolysis of 3-indolylsuccinic acid (VIII) results in decarboxylation and the formation of β-(3-indolyl)propionic acid.

Another convenient method of preparing β-(3-indolyl) propionic acid from 3-indolealdehyde involves condensing 3-indolealdehyde (I) with a dialkyl malonate (III) as illustrated in the first step of second scheme for the preparation of 3-indolylsuccinic acid discussed above. The resulting product, alkyl 2-carboalkoxy-3-(3'-indolyl)acrylate (V) is treated according to the following scheme, wherein R represents a lower alkyl group

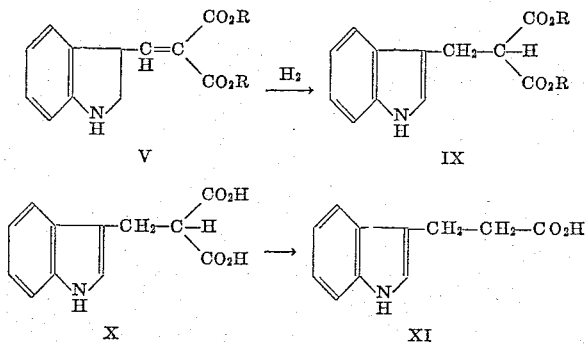

Thus, alkyl 2-carboalkoxy-3-(3'-indolyl)acrylate (V) is hydrogenated to yield dialkyl 3-indolylmethylmalonate (IX). The malonic ester is saponified and the resulting malonic acid (X) decarboxylated to β-(3-indolyl)propionic acid (XI).

The new 3-indolylsuccinimide (XIII) derivatives of the present invention are prepared from 3-indolylsuccinic acid (VIII) in either of two ways depending upon the complexity of substituent on the imido nitrogen of the final product. Thus, 3-indolylsuccinimides (XIII) and N-alkyl-3-indolylsuccinimides (XIII) can be prepared by reacting 3-indolylsuccinic acid (VIII) and a urea compound (XII) according to the following scheme:

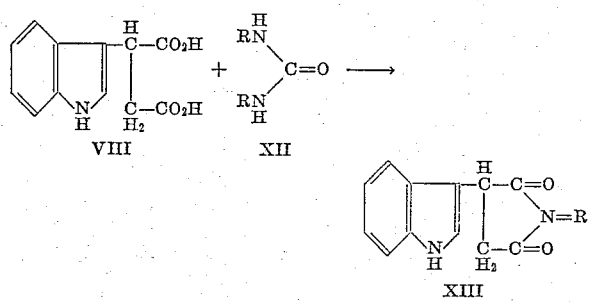

wherein R represents a hydrogen or a lower alkyl group (i.e. from one to five carbon atoms). This method is very advantageous in that it alleviates the necessity of using the lower boiling amines and ammonia or ammonium hydroxide in this type reaction. All of the 3-indolylsuccinimide derivatives may be prepared by reacting 3-indolylsuccinic acid (VIII) with a compound of the general formula, $NH_2R$ (XIV), wherein R represents a member of the group consisting of hydrogen, alkyl, dialkylaminoalkyl, (N-morpholino)alkyl, and (2-pyridyl)alkyl (the term alkyl is intended to be a lower alkyl group containing one to five carbon atoms, inclusive).

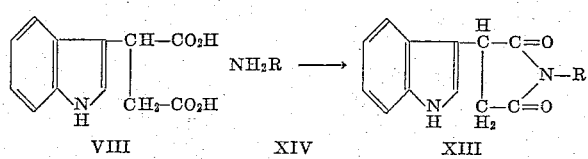

The new 3-(3'-indolyl)pyrrolidines (XV) are prepared by reducing the 3-indolylsuccinimides (XIII) by means of a suitable reducing agent such as lithium aluminum hydride according to the following scheme:

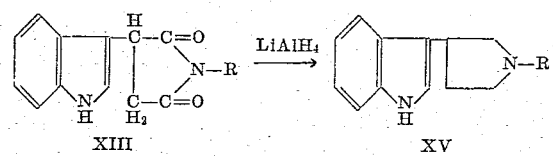

wherein R represents a member of the group consisting of hydrogen, alkyl, dialkylaminoalkyl, (N-morpholino)alkyl and (2-pyridyl)alkyl (the term alkyl being used in the sense of a lower alkyl group, i.e. one to five carbon atoms inclusive).

With the exception of 3-indolylsuccinimide and the N-alkyl-3-indolylsuccinimides, all of the compounds of the invention are of sufficient bassicity to form nontoxic salts with inorganic acids, such as, hydrochloric, hydrobromic, hydroiodic, sulfuric, nitric, phosphoric, etc. and organic acids, such as, acetic, propionic, citric, tartaric, etc. These acid addition salts may all be made by a general process which involves reacting the basic compound with the acid, preferably in the presence of an inert solvent.

The series of reactions employed in the preparation of both β-(3'-indolyl)propionic acid and 3-indolylsuccinic acid from 3-indolealdehyde are new variations of standard preparatory methods of synthetic organic chemistry. Detailed discussions of various modes of effecting these may be found in such works as "Synthetic Organic Chemistry," by Wagner and Zook, and "Organic Reactions," edited by R. Adams.

The first step in both preparations of 3-indolylsuccinic acid and in the synthesis of β-(3'-indolyl)propionic acid involve condensing 3-indolealdehyde with a compound containing an active methylene group. Such a reaction is usually known in the art as a Knoevenagel Reaction. Thus, in two of the schemes 3-indolealdehyde is condensed with an alkyl malonate, preferably ethyl malonate to yield an alkyl 2-carbalkoxy-3-(3'-indolyl)acrylate. In accordance with the standard procedure, it has been found that the condensation is best effected in the presence of a salt of an organic base and an organic acid. The preferred salt is piperidine acetate. This type reaction has been carried out using a variety of solvents and at reflux temperature of the reaction mixture. The preferred solvent for the reaction is benzene and at the reflux temperature of the benzene solution of the reactants. In the other preparatory scheme, 3-indolealdehyde is condensed with the active methylene group of an alkyl cyanoacetate in the presence of an organic nitrogenous base. Again, the temperature employed is the reflux temperature of the reaction mixture. The preferred reaction system uses ethyl cyanoacetate, piperidine, and ethanol as the solvent, this yields ethyl 2-cyano-3(3'-indolyl)acrylate as the final product.

When it is desired to prepare 3-indolylsuccinic acid, the 3-(3'-indolyl)acrylates, discussed above, are treated in such a manner as to add hydrogen cyanide across the acrylate olefinic bond. Although a variety of methods could be employed, the most convenient method to add hydrogen cyanide to this type of olefinic linkage (which is activated by adjacent groups, such as, cyano and carbalkoxy) is to treat the unsaturated compound with an alkali cyanide in either an aqueous or alcoholic solution, depending upon the solubility of the olefinic compound to be treated, at the reflux temperature of the reaction mixture.

If the preparation of β-(3'-indolyl)propionic acid is to be effected without the intermediate preparation of 3-indolylsuccinic acid, then the alkyl 2-carbalkoxy-3-(3'-indolyl)acrylate is catalytically hydrogenated to yield an alkyl (3-indolyl)methylmalonate. Catalytic hydrogenations of this general type have been effected using a variety of catalysts, such as, Raney nickel, platinum and palladium. The preferred method of operation is to use a platinum oxide catalyst and hydrogenate an alcoholic solution of the (3'-indolyl)acrylate.

In the synthesis of 3-indolylsuccinic acid, the nitriles produced above are hydrolyzed by refluxing the nitrile with aqueous base, preferably potassium hydroxide, and acidification yields 3-indolylsuccinic acid. Decarboxylation of 3-indolylsuccinic acid yields β,-(3'-indolyl)propionic acid.

The product of the above discussed catalytic hydrogenation [alkyl (3-indolyl)methylmalonate] is saponified with aqueous base, acidification of the reaction product yields (3-indolyl)methylmalonic acid and decarboxylation of this acid yields β-(3'-indolyl)propionic acid.

A clearer understanding of each of the steps in the three reaction schemes may be obtained from the examples given below, which disclose the best modes of carrying out this invention. In the following examples all melting points given are uncorrected and the yields are over-all yields, which are based upon the amount of initial reactants.

EXAMPLE 1

*Ethyl 2-Cyano-3-(3'-Indolyl)Acrylate (IV)*

A solution of 56.5 grams (0.5 mole) of ethyl cyanoacetate in 125 ml. of ethanol was added to a refluxing solution of 72.5 grams (0.5 mole) of 3-indolealdehyde in 750 ml. of ethanol. The resulting reaction mixture was heated to reflux and 5 ml. of piperidine was added. After refluxing for approximately ten minutes, the reaction mixture was allowed to slowly cool to room temperature. Upon cooling a mass of bright yellow crystals was deposited and these were collected by filtration, washed and dried. These crystals weighed 102.5 grams and had a melting point of 164–165° C. A second crop of crystals, weighing 15 grams (M.P. 162–164° C.) was obtained by concentrating the above filtrate to approximately one-third its original volume. This gave a total yield of 117.5 grams (0.49 mole, 98% yield).

EXAMPLE 2

*3-Indolylsuccinonitrile (VI)*

A mixture of 96 grams (0.4 mole) of ethyl 2-cyano-3-(3'-indolyl)acrylate and 52 grams (0.8 mole) of potassium cyanide in 500 ml. of 90% ethanol was refluxed, with stirring, under a nitrogen atmosphere for three hours. During the refluxing period some material crystallized out of solution (probably $K_2CO_3$). After being cooled in ice, the reaction mixture was filtered to remove the inorganic solid and the residual solid was washed with 80 ml. of 95% ethanol. The filtrate and the washings were combined and concentrated under reduced pressure to one-half of the original volume. This concentrated solution was heated to 65–70° C., diluted with an equal volume of water, again heated to 65–70° C. and then allowed to crystallize. The dark brown crystals deposited were collected and dried; yield 59 grams of crude material, melting point 113–116° C. Recrystallization of the crude material from 50% aqueous methanol yielded 52 grams (0.34 mole, 66% yield) of pure product, melting point 117–118° C.

*Analysis.*—Calcd. for $C_{12}H_9N_3$: C, 73.83; H, 4.65; N, 21.5. Found: C, 73.80; H, 4.65; N, 21.2. Infrared (KBr) (u); 3.00 (NH); 4.45 (CN).

EXAMPLE 3

*3-Indolylsuccinic Acid (VIII)*

A suspension of 39 grams (0.2 mole) of 3-indolylsuccinonitrile in 330 ml. of 15% aqueous potassium hydroxide was refluxed for a period of three hours. The resultant clear dark solution was treated with charcoal, filtered, cooled and acidified to a pH of approximately 2 with concentrated hydrochloric acid. The white crystalline product was collected, washed with cold water and dried. The dried product weighed 44.5 grams (0.19 mole, 95% yield), melting point 197–200° C. (with gas evolution). An analytical sample, recrystallized from water, had a melting point of 204–205° C. (dec.).

*Analysis.*—Calcd. for $C_{12}H_{11}NO_4$: C, 61.80; H, 4.72; neut. equiv. 116.6. Found: C, 62.10; H, 4.88; neut. equiv. 116.7. Infrared (KBr) (u); 2.92 (NH); 5.98 (C=O).

EXAMPLE 4

*β-(3-Indolyl)Propionic Acid (XI)*

Pyrolysis of a sample of 3-indolylsuccinic acid for two to three hours at 205° C. gave a vigorous evolution of carbon dioxide; the residue was cooled and recrystallized from 20% ethanol water. The colorless crystals thus obtained melted at 133–134° C. either alone or upon admixture with an authentic sample of β-(3-indolyl)propionic acid.

EXAMPLE 5

*Ethyl 2-Carbethoxy-3-(3'-Indolyl)Acrylate (V)*

Six milliliters of piperidine, 9 ml. of glacial acetic acid and 43.5 grams (0.3 mole) of 3-indolealdehyde was added to a solution of 48 grams (0.3 mole) of diethyl malonate in 600 ml. of benzene and the resulting mixture was refluxed for a period of four hours with removal of 5.4 ml. of water through a Dean-Stark trap. The benzene solvent was removed under reduced pressure and the resulting residue was crystallized from aqueous ethanol. A yield of 60 grams (0.21 mole, 70% yield) of a pale yellow crystalline product having a melting point of 99–100° C. was obtained.

*Analysis.*—Calcd. for $C_{16}H_{17}NO_4$: C, 66.88; H, 5.97. Found: C, 67.04; H, 5.87. Infrared (KBr) (u); 3.08 (NH); 5.82, 5.92 and 8.05 (ester).

EXAMPLE 6

*Ethyl 3-Cyano-3-(3'-Indolyl)Propionate (VII)*

Thirty-one grams (0.48 mole) of potassium cyanide was added to a solution of 69 grams (0.24 mole) of ethyl 2-carbethoxy-3-(3'-indolyl)acrylate in 300 ml. of 90% ethanol and the resulting mixture was refluxed with stirring for approximately two hours. During the refluxing period an inorganic solid separated from the reaction mixture. After cooling, the reaction mixture was filtered and the residual solid was washed with 25 ml. of 95% ethanol. The filtrate and washings were combined, diluted with 800 ml. of water and allowed to crystallize. The resulting crystalline material was collected, washed and dried. The crude product weighed 25.5 grams (0.146 mole, 61% yield) and had a melting point of 108–110° C. Successive recrystallization from ethyl acetate and benzene yielded an analytical sample melting at 110–111° C.

*Analysis.*—Calcd. for $C_{14}H_{14}N_2O_2$: C, 69.40; H, 5.82. Found: C, 69.82; H, 5.16.

EXAMPLE 7

*3-Indolylsuccinic Acid (VIII)*

The process of Example 3 was carried out using 48.4 gms. (0.2 mole) of ethyl 3-cyano-3-(3'-indolyl)propionate instead of 3-indolylsuccinonitrile. A product and yield like that of Example 3 was obtained.

EXAMPLE 8

*Diethyl(3-Indolyl)Methylmalonate (IX)*

Hydrogenation of ethyl 2-carbethoxy-3-(3'-indolyl)-acrylate in ethanol over platinum oxide gave a 62% yield of diethyl(3-indolyl)methylmalonate, melting point 61–63° C. (recrystallized from benzene-n-pentane). An analytical sample recrystallized from ethanol-water had a melting point 63–65° C.

*Analysis.*—Calcd. for $C_{16}H_{19}NO_4$: C, 66.42; H, 6.62. Found: C, 66.68; H, 6.67. Infrared (KBr) (u); 2.97 (NH); 5.77 and 5.83 (C=O).

EXAMPLE 9

*3-Indolylmethylmalonic Acid (X)*

Diethyl(3-indolyl)methylmalonate was saponified by refluxing 2.8 grams (0.01 mole) of the ester with 25 ml. of a 15% potassium hydroxide solution for one hour. The resulting solution decolorized with charcoal, filtered, cooled and acidified to a pH of 2 with concentrated hydrochloric acid. The reddish crystals deposited were collected, dried and weighed 1.6 grams (.0089 mole, 89% yield), melting point 182–184° C. (dec.). An analytical sample recrystallized from water had a melting point of 185–187° C. (dec.).

*Analysis.*—Calcd. for $C_{12}H_{11}NO_4$: C, 61.08; H, 4.74. Found: C, 62.08; H, 4.94.

EXAMPLE 10

β-(3'-Indolyl)Propionic Acid (XI)

A sample of 3-indolylmethylmalonic acid was pyrolyzed at a temperature of 190–200° C. The product obtained (46% yield) had a melting point of 132–134° C. either alone or upon admixture with an authentic sample of β-(3'-indolyl)propionic acid.

The two new series of compounds of the present invention, the 3-indolylsuccinimides and the 3-indolylpyrrolidines, are both most conveniently prepared utilizing 3-indolylsuccinic acid as the starting compound. Thus, 3-indolylsuccinimide and N-alkyl-3-indolylsuccinimides may be prepared from 3-indolylsuccinic acid by either of two methods. The preferred method of synthesis involves heating an intimate mixture of urea or 1,3-dialkylurea with 3-indolylsuccinic acid. In general, the temperature range which is used is between the melting point of the urea compound and the melting point of 3-indolylsuccinic acid. Thus, when using urea a temperature range of 135° C. to 200° C. may be used. Preferably, a temperature range of 160°–190° C. is used, as this makes possible a rapid reaction, without decomposing an excessive amount of the 3-indolylsuccinic acid. The other method of synthesis involves reacting with 3-indolylsuccinic acid, ammonia or an alkyl amine. When 3-indolylsuccinic acid and ammonia are reacted, the acid is first converted to the diammonium salt and this is then slowly heated to a temperature of approximately 235° C. to effect cyclization.

All of the N-substituted 3-indolylsuccinimides are prepared by a general method which involves reacting the 3-indolylsuccinic acid and an amino compound in a suitable solvent medium at the reflux temperature of the reaction mixture with concomitant removal of the water formed. Thus, any of the following solvents are satisfactory, aromatic hydrocarbons, such as benzene, toluene, xylene, etc., ethers, such as diethyl ether, dipropyl ether, dioxane, etc., and higher boiling aliphatic hydrocarbons, such as hexanes, heptanes, etc.

The indolylpyrrolidines are prepared by reducing the carbonyl groups of the indolylsuccinimides by means of a suitable reducing agent. Thus, reducing agents, such as acidic zinc dust, alcoholic sodium, or catalytic hydrogen, may be used. The preferred reducing agent is one of the metal hydride type, such as lithium aluminum hydride. Reducing agents of this type are discussed and experimental procedures summarized in Gaylord's "Reduction With Complex Metal Hydrides" [Interscience Publishers (1956)]. The use of lithium aluminum hydride as the reducing agent is illustrated in the examples given below. Suitable solvents for this reduction include diethyl ether, dioxane, tetrahydrofuran, and diethyleneglycol dimethyl ether. The procedure used is essentially the same as is common in the art and discussed in the above treatise. Thus, a solution of the imide is added to a slurry of the hydride and a suitable solvent. The rate of addition is such that a condition of brisk reflux is maintained and upon completion of addition of the imide solution, the reaction mixture is heated for an additional period of time to insure complete reduction of the imide compound. The reaction mixture is then decomposed by the gradual addition of water and the solid inorganic material removed by filtration.

So that those skilled in the art may have a clear understanding of the methods employed in obtaining the new compounds of the invention, the following examples are offered, which disclose the best modes of carrying out this invention. In the following examples all melting points given are uncorrected and the yields are over-all yields, which are based upon the amount of initial reactants.

EXAMPLE 11

3-Indolylsuccinimide

An intimate mixture of 35 grams (0.15 mole) of 3-indolylsuccinic acid and 70 grams (0.46 mole) of urea in a flask fitted with an air condenser was introduced into an oil-bath at 160° C. The bath temperature was raised to 185° C. during a period of 30 minutes and then maintained in the range of 180–190° C. for a period of two and one-half hours. During the initial period of heating at 180–190° C. a brisk evolution of ammonia was evident. After the completion of heating the hot melt was treated with 250 ml. of water, cooled and filtered. Recrystallization of the crude product from methanol yielded 17 grams (.08 mole, 53% yield) of 3-indolylsuccinimide. The white crystals obtained had a melting point of 197–198° C.

*Analysis.*—Calcd. for $C_{12}H_{10}N_2O_2$: C, 67.29; H, 4.67. Found: C, 67.33; H, 4.70. Infrared (KBr) (u); 2.92 (indole NH); 5.50 and 5.65 (C=O), 5.86 and 5.95 (imide NH).

EXAMPLE 12

3-Indolylsuccinimide

Four grams (0.017 mole) of 3-indolylsuccinic acid were added slowly to 5 ml. of concentrated ammonium hydroxide contained in a round bottom flask. The resulting solution was heated slowly to a temperature of approximately 230° C. Upon reaching this temperature the heating was discontinued and the brown viscous reaction mixture was allowed to cool slowly to room temperature. The cooled resinous reaction product was dissolved in diethyl ether and allowed to stand over night. At the end of this period a crystalline mass had formed and these crystals were collected by filtration. After recrystallization from ethanol-water (ca. 50% ethanol) and 95% ethanol a yield of 3 grams (.014 mole, 82.5% yield) of crude product was obtained, melting point 175–178° C. The crude product was recrystallized twice from 95% ethanol and gave a pure product, melting point 194–195° C.

*Analysis.*—Calcd. for $C_{12}H_{10}O_2N_2$: C, 67.29; H, 4.67; N, 13.08. Found: C, 67.4; H, 4.89; N, 12.8.

EXAMPLE 13

N-Methyl-3-Indolylsuccinimide

An intimate mixture of 11.7 grams (0.05 mole) of 3-indolylsuccinic acid and 13.4 grams (0.15 mole) of 1,3-dimethylurea contained in a flask fitted with an air condenser was introduced into an oil bath at 165° C. The temperature of the oil bath was raised to 185° C. during a 10 minute interval and maintained at a temperature of 180–190° C. for a period of one hour. The hot mixture was diluted with water, cooled and filtered. Recrystallization of the crude product from acetonitrile yielded 8 grams (0.035 mole, 70.7% yield) of N-methyl-3-indolylsuccinimide, melting point 177.5°–179° C.

*Analysis.*—Calcd. for $C_{13}H_{12}N_2O_2$: C, 68.14; H, 5.30. Found: C, 68.12; H, 5.14.

The use of other dialkyl substituted ureas in the place of dimethylurea in the process of Example 13 resulted in the formation of the corresponding N-alkyl-3-indolylsuccinimides. Thus, for example, when dialkylureas, such as diethyl-, dipropyl-, di-t-butyl- and dipentyl-ureas were used, good yields of the corresponding N-ethyl-, N-propyl-, N-t-butyl-, and N-pentyl-, 3-indolylsuccinicides were obtained.

EXAMPLE 14

N-[4-(Diethylamino)-1-Methylbutyl]-3-Indolylsuccinimide

A mixture of 23.3 grams (0.10 mole) of 3-indolylsuccinic acid and 15.8 grams (0.10 mole) of 2-amino-5-diethyl-aminopentane in 400 ml. of toluene was refluxed for a period of 138 hours. The yellow colored solution was filtered to remove a small amount of gummy residue and then cooled. Upon cooling a good yield of crystalline N - [4 - (diethylamino) - 1 - methylbutyl] - 3 - indolylsuccinimide was obtained.

EXAMPLE 15

N-[(2-Diethylamino)Ethyl]-3-Indolylsuccinimide

A mixture of 23.3 grams (0.10 mole) of 3-indolylsuccinic acid and 12.8 grams (0.11 mole) of 2-(diethylamino)-1-aminoethane in 250 ml. of toluene was refluxed for a period of 17 hours with removal of the water formed. The light yellow colored solution was filtered from a small amount of gum and allowed to cool. Upon cooling a considerable quantity of N-[(2-diethylamino)-ethyl]-3-indolylsuccinimide was obtained.

Substitution of other N-dialkylaminoalkylamines for 2-(diethylamino)-1-aminoethane in the process of Example 15 gave substantial yields of the corresponding N-substituted 3-indolylsuccinimide. Thus, for example, when amines, such as 3-(dimethylamino)-1-aminopropane, 3-(dimethylamino)-1-amino-2-methylpropane, and 4-(diethylamino)-1-aminobutane were substituted for 2-(diethylamino)-1-aminoethane, excellent yields of the corresponding N-substituted-3-indolylsuccinimides; N-[3-(dimethylamino)propyl] - 3 - indolylsuccinimide, N - [3 - (dimethylamino)-2-methylpropyl]-3-indolylsuccinimide and N-[4-(diethylamino)butyl]-3-indolylsuccinimide, were obtained.

EXAMPLE 16

N-Propyl-3-Indolylsuccinimide

The process of Example 15 was used to effect a reaction between 3-indolylsuccinic acid and n-propylamine. This reaction gave a substantial quantity of N-propyl-3-indolylsuccinimide.

When the process of Example 15 was repeated using other simple alkylamines instead of n-propylamine similar results were obtained. Thus, the use of amines, such as ethylamine, n-butylamine and 2-aminobutane resulted in the formation of the corresponding N-alkyl-3-indolylsuccinimides, N-ethyl-3-indolylsuccinimides, N-(n-butyl)-3-indolylsuccinimide, and N-(2-butyl)-3-indolylsuccinimide.

EXAMPLE 17

N-[2-(N'-Morpholino)Ethyl]-3-Indolylsuccinimide

A mixture of 23.3 grams (0.10 mole) of 3-indolylsuccinic acid, 13.0 grams (0.10 mole) of N-(2-aminoethyl) morpholine and 300 ml. of dry toluene was refluxed for a period of 20 hours, 3.7 ml. of water being removed through a Dean-Stark trap. The resulting solution was decanted from a small amount of gum in the flask and filtered. After standing at room temperature for approximately 12 hours, a large crop of crystalline material had been deposited, this material was collected and dried. Concentration of the mother liquor yielded a second crop of crude material. The total weight of crude material obtained was 30.2 gms. (0.092 mole, 92% yield) melting point 103.5–108° C. Recrystallization of this material from 95% ethanol yielded crystals with a melting point range of 107–108.5° C.

Analysis.—Calcd. for $C_{18}H_{21}N_3O_3$: C, 66.03; H, 6.47. Found: C, 66.65; H, 6.46.

EXAMPLE 18

N-[2-(N'-Morpholino)Ethyl]-3-Indolylsuccinimide Hydrochloride

The hydrochloride salt was prepared by dissolving 21 grams of the amine N-[2-(N'-morpholino)ethyl]-3-indolylsuccinimide in 200 ml. of absolute methanol and adding to this an excess of methanolic hydrogen chloride. The reaction product was concentrated in vacuo until a syrup was obtained. The syrup was diluted with ethyl acetate until a heavy precipitate was obtained. This precipitate was recrystallized from a mixture of methanol and ethyl ether and yielded crystals with a melting point range of 172.5–174.5° C.

Analysis.—Calcd. for $C_{18}H_{22}ClN_3O_3$: C, 59.5; H, 6.16. Found: C, 59.31; H, 5.82.

EXAMPLE 19

N-[3(N'-Morpholino)Propyl]-3-Indolylsuccinimide

A mixture of 23.3 grams (0.10 mole) of 3-indolylsuccinic acid and 14.4 grams (0.10 mole) of N-(3-aminopropyl)-morpholine in 400 ml. of dry toluene was refluxed for a period of 16 hours, 3.6 ml. of water being collected in a Dean-Stark trap. The resulting yellow solution was filtered to remove a small amount of gummy material and then stored in a cold room. The white precipitate was collected, dried and yielded 31.7 gms. (93% yield) of crude product. Recrystallization of the crude material from ethyl acetate gave 25 gms. (0.073 mole, 73% yield) of pure product, melting point 138–139.5° C.

Analysis.—Calcd. for $C_{19}H_{23}N_3O_3$: C, 66.84; H, 6.79. Found: C, 66.76; H, 6.62.

Results similar to those obtained in Examples 17 and 19 were produced when other (N-morpholino)alkylamines were substituted for those used in Examples 17 and 19. Thus, for example, the use of amino compounds, such as 3-(N-morpholino)-2-aminopropane and 4-(N-morpholino)-1-aminobutane, resulted in the formation of the corresponding N-(N'-morpholino)alkyl-3-indolylsuccinimides; N-[2-(N'-morpholino)-2-methylethyl]-3-indolylsuccinimide and N-[4-(N'-morpholino)butyl]-3-indolylsuccinimide.

EXAMPLE 20

N-[2-(2'-Pyridyl)Ethyl]-3-Indolylsuccinimide

A mixture of 23.3 grams (0.10 mole) of 3-indolylsuccinic acid and 13.4 grams (0.11 mole) of 2-(2-aminoethyl)pyridine dissolved in 250 ml. of dry toluene was refluxed for 16 hours with removal of the theoretical amount of water. The reaction mixture was concentrated by removing approximately 150 ml. of toluene and upon cooling a heavy oil was obtained. Trituration of the partially crystallized oil gave a completely crystalline product. After collection and drying of the crude crystals a yield of 31.5 grams (0.098 mole, 98% yield) of crude product was obtained. Recrystallization of the crude product from ethyl acetate gave 24.5 grams (0.076 mole, 76% yield) of pure product, melting point 151–153° C.

Analysis.—Calcd. for $C_{19}H_{17}N_3O_2$: C, 71.45; H, 5.37. Found: C, 71.25; H, 5.42.

The use of other (2-pyridyl) alkylamines in the process of Example 20 gave similar results. Thus, for example, the use of amine compounds, such as 4-(2'-pyridyl)-1-aminobutane and 2-(2'-pyridyl)-2-aminopropane, resulted in the formation of the corresponding N-(2-pyridyl)akyl - 3 - indolylsuccinimides; N - [4 - (2' - pyridyl) butyl] - 3 - indolylsuccinimide and N-[2-(2'-pyridyl)-2-methylethyl]-3-indolylsuccinimide.

EXAMPLE 21

3-(3'-Indolyl)Pyrrolidine

A slurry of 10.2 grams (0.27 mole) of lithium aluminum hydride in 200 ml. of dioxane was heated to slightly below reflux temperature and a solution of 18.7 grams (0.087 mole) of 3-indolylsuccinimide in 150 ml. of dioxane was added to the vigorously stirred slurry at a rate sufficient to cause a brisk reflux of the reaction mixture. After completion of addition of the imide solution, an additional 100 ml. of dioxane was added to the reaction mixture and a refluxing condition maintained for a period of 17 hours. At the end of this period, the solution was cooled and decomposed by the addition of ice water. The precipitated solid was removed by filtration and washed with dioxane. The dioxane solution was concentrated in vacuo. The majority of the resulting brown oil was dissolved in ethyl ether and therefore separated from an ether insoluble portion. The ethereal solution was dried over anhydrous sodium sulfate and concentrated in vacuo. The residue (16 grams) after standing had crystallized and was recrystallized from ethyl acetate. This gave 6.8 grams (0.036 mole, 13.5% yield) of semi-pure product, melting point 99.5–103° C. A second recrystallization from ethyl acetate gave a purer product, melting point 102–104.5° C.

EXAMPLE 22

*3-(3'-Indolyl)-N-Methylpyrrolidine*

A slurry of 15.2 grams (0.40 mole) of lithium aluminum hydride and 400 ml. of dry dioxane was heated to slightly below reflux temperature and a solution of 22.8 grams (0.10 mole) of N-methyl-3-indolylsuccinimide in 300 ml. of dioxane was then added to the vigorously stirred slurry of lithium aluminum hydride at a rate sufficient to cause a brisk reflux of the reaction mixture. After completion of addition (45 minutes) of the imide solution, the reaction mixture was refluxed for an additional 21 hour period. At the end of this time, the reaction mixture was cooled and ice water was slowly added until a white solid had replaced the gray lithium aluminum hydride. The reaction mixture was filtered and the solid residue washed with dioxane. These dioxane washings were combined with the reaction mixture. A pale yellow oil, which slowly crystallized, remained after in vacuo removal of the dioxane. The weight of the crude product was 17 grams (0.85 mole, 85% yield). Recrystallization of the crude product from ethyl acetate gave white crystals, melting point 111.5–113° C.

*Analysis.*—Calcd. for $C_{13}H_{16}N_2$: C, 77.96; H, 9.05. Found: C, 78.45; H, 8.27.

The use of other N-alkyl-3-indolylsuccinimides, such as N-propyl-3-indolylsuccinimide and N-(2-butyl)-3-indolylsuccinimide, in the process of Example 22 resulted in the formation of the corresponding 3-(3'-indolyl)-N-alkylpyrrolidines; 3-(3'-indolyl)-N-(propyl)pyrrolidine and 3-(3-'indolyl)-N-(2-butyl)-pyrrolidine.

EXAMPLE 23

*3-(3'-Indolyl)-N-[2-N'-(Diethyl)Aminoethyl]Pyrrolidine*

A solution of 31.3 grams (0.10 mole) of N-[2-N'-(diethyl)aminoethyl]-(3'-indolyl)succinimide in 150 ml. of diethyl ether was added to a vigorously stirred suspension of 11.4 grams (0.30 mole) of lithium aluminum hydride in 300 ml. of diethyl ether. The rate of addition was adjusted so a condition of brisk reflux was maintained. After completion of addition, the reaction mixture was refluxed for an additional 17 hour period. At the end of the reaction period, the reaction mixture was decomposed by the gradual addition of ice water. The white solid formed was separated by filtration and washed with ether. The ethereal solution was separated from the aqueous phase, dried over anhydrous sodium sulfate and concentrated. Distillation of the residue gave 12 grams (0.042 mole, 42% yield) of a yellow oily product.

When other N-dialkylaminoalkyl-3-indolylsuccinimides, such as N-[4-(diethylamino)-1-methylbutyl]-3-indolylsuccinimide and N-[3-(dimethylamino)propyl]-3-indolylsuccinimide were reduced according to the process of Example 23 excellent yields of the corresponding 3-(3'-indolyl)-N-(dialkylaminoalkyl)pyrrolidines; 3-(3'-indolyl)-N-[4-(diethylamino)-1-methylbutyl]pyrrolidine and 3-(3'-indolyl)-N-[3-(dimethylamino)propyl]pyrrolidine, were obtained.

EXAMPLE 24

*3-(3'-Indolyl)-N[2-(N'-Morpholino)Ethyl]Pyrrolidine Hydrochloride*

A solution of 39.9 grams (0.12 mole) of N[2-(N'-morpholino)ethyl]-3-indolylsuccinimide in 300 ml. of dioxane was added to a heated, vigorously stirred suspension of 13.6 grams (0.35 mole) of lithium aluminum hydride in 300 ml. of dioxane. The rate of addition of the imide solution was adjusted so as to maintain a brisk refluxing of the reaction mixture. After completion of addition (45 minutes) of the imide solution, the reaction mixture was refluxed for an additional period of 17 hours. The reaction mixture was treated with ice water to decompose the unreacted lithium aluminum hydride and filtered. The solid residue was washed with dioxane and these washings were combined with the dioxane-water reaction product. The resulting mixture was then concentrated in vacuo. The residual gum, which remained after the removal of the dioxane, was dissolved in methanol and treated with methanolic hydrogen chloride. Addition of ether to the methanolic solution resulted in the precipitation of the white crystalline dihydrochloride. The crude dihydrochloride was collected, dried and weighed 37.5 grams (.099 mole, 85% yield), melting point 256–258° C. (D).

The crude dihydrochloride was recrystallized from methanol, collected and dried. This gave 24.4 grams (.09 mole, 75% yield) of pure product, melting point 256.5–257° C.

*Analysis.*—Calcd. for $C_{18}H_{26}N_3OCl_2$: C, 58.00; H, 7.30. Found: C, 58.19; H, 7.36.

Reduction of other [(N'-morpholino)alkyl]-3-indolylsuccinimides, such as N[3-(N'-morpholino)propyl]-3-indolylsuccinimide and N[2-(N'-morpholino)-2-methylethyl]-3-indolylsuccinimide, according to the process of Example 24 resulted in the formation of substantial quantities of the corresponding 3-(3'-indolyl)-N[(N'-morpholino)alkyl]pyrrolidines; 3-(3'-indolyl)-N[3(N'-morpholino)propyl]pyrrolidine and 3-(3'-indolyl)-N[2-(N'-morpholino)-2-methylethyl]pyrrolidine.

EXAMPLE 25

*3-(3'-Indolyl)-N[2-(2'-Pyridyl)-Ethyl]Pyrrolidine*

A solution of 32 grams (0.10 mole) of N-[2-(2'-pyridyl)-ethyl]-3-indolylsuccinimide in 300 ml. of dioxane was slowly added to a heated vigorously stirred suspension of 11.1 grams (0.30 mole) of lithium aluminum hydride in 500 ml. of dioxane. The rate of addition of the imide solution was adjusted so as to maintain a brisk refluxing of the reaction mixture. After completion of addition of the imide solution, the reaction mixture was refluxed for an additional 17 hour period. The reaction mixture was decomposed with ice water and the inorganic solid separated and washed. The dioxane solution was concentrated in vacuo. The resulting brown gum was dissolved in hot benzene and allowed to recrystallize. Upon recrystallization a good yield of material was obtained.

Treatment of other N[(2-pyridyl)alkyl]-3-indolylsuccinimides, such as N-[4-(2'-pyridyl)butyl]-3-indolylsuccinimide and N-[2-(2'-pyridyl)-2-methylethyl]-3-indolylsuccinimide with lithium aluminum hydride according to the process of Example 25 gave good yields of the corresponding 3-(3'-indolyl)-N-[(2-pyridyl)alkyl]pyrrolidines; 3-(3'-indolyl)-N-[4-2'pyridyl)-butyl]pyrrolidine and 3-(3'-indolyl)-N-[2-(2'-pyridyl)-2-methylethyl]pyrrolidine.

We claim:

1. A compound of the group consisting of compounds of the formula

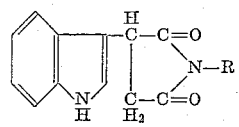

wherein R is a member selected from the group consisting of hydrogen, alkyl, dialkylaminoalkyl, N-morpholinoalkyl and 2-pyridylalkyl and nontoxic acid addition salts of compounds of said formula wherein R is a member selected from the group consisting of dialkylaminoalkyl, N-morpholinoalkyl and 2-pyridylalkyl, said alkyl having one to five carbon atoms inclusive.

2. 3-indolylsuccinimide.

3. A compound of the group consisting of compounds of the formula

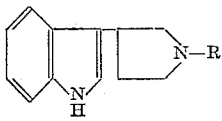

wherein R is a member selected from the group consisting of hydrogen, alkyl, dialkylaminoalkyl, N-morpholinoalkyl and 2-pyridylalkyl; and nontoxic acid addition salts thereof, said alkyl having one to five carbon atoms inclusive.

4. 3-(3-indolyl)pyrrolidine.

5. 3-(3'-indolyl)-N-methylpyrrolidine.

6. A compound of the formula

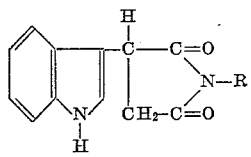

wherein R represents alkyl having one to five carbon atoms inclusive.

7. A compound of the formula

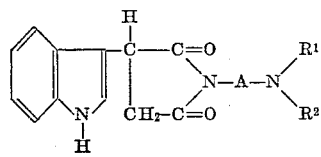

wherein $R^1$ and $R^2$ represent alkyl having one to five carbon atoms inclusive and A represents a bivalent saturated alkylene radical having one to five carbon atoms inclusive.

8. A compound of the formula

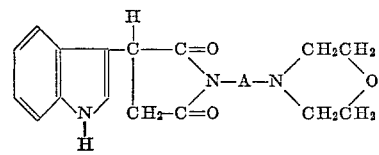

wherein A represents a bivalent saturated alkylene radical having one to five carbon atoms inclusive.

9. A compound of the formula

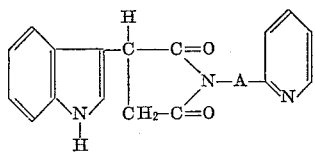

wherein A represents a bivalent saturated alkylene radical having one to five carbon atoms inclusive.

10. A compound of the formula

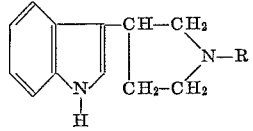

wherein R represents alkyl having one to five carbon atoms inclusive.

11. A compound of the formula

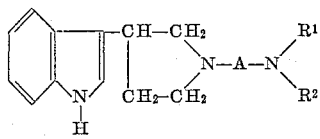

wherein $R^1$ and $R^2$ represent alkyl having one to five carbon atoms inclusive and A represents a bivalent saturated alkylene radical having one to five carbon atoms inclusive.

12. A compound of the formula

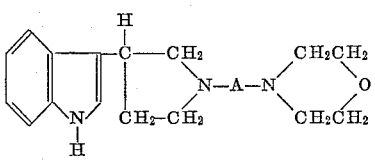

wherein A represents a bivalent saturated alkylene radical having one to five carbon atoms inclusive.

13. A compound of the formula

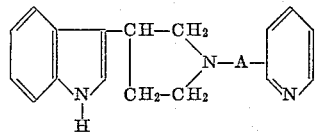

wherein A represents a bivalent saturated alkylene radical having one to five carbon atoms inclusive.

References Cited in the file of this patent

UNITED STATES PATENTS 2,873,281   Rosen _____ Feb. 10, 1959

OTHER REFERENCES

Classification Bulletin of the United States Patent Office, Chemistry Carbon Compounds, Number 200, pages 260–70.